(12) United States Patent
Tanizawa et al.

(10) Patent No.: US 7,460,340 B2
(45) Date of Patent: Dec. 2, 2008

(54) DISK DRIVE, AND ACTUATOR AND HEAD ACTUATOR ASSEMBLY

(75) Inventors: Hirokazu Tanizawa, Kanagawa (JP); Hitoshi Tsujino, Kanagawa (JP); Hiroyasu Tsuchida, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 409 days.

(21) Appl. No.: 11/311,998

(22) Filed: Dec. 19, 2005

(65) Prior Publication Data
US 2006/0132982 A1 Jun. 22, 2006

(30) Foreign Application Priority Data
Dec. 22, 2004 (JP) .............................. 2004-371239

(51) Int. Cl.
*G11B 5/55* (2006.01)
(52) U.S. Cl. .................................................. 360/265.8
(58) Field of Classification Search .............. 360/265.7, 360/265.9
See application file for complete search history.

(56) References Cited

U.S. PATENT DOCUMENTS

| | | | |
|---|---|---|---|
| 6,185,075 B1* | 2/2001 | Tsujino et al. ........... | 360/265.7 |
| 6,738,228 B2* | 5/2004 | Utsunomiya ............. | 360/265.7 |
| 6,879,466 B1* | 4/2005 | Oveyssi et al. ........... | 360/265.7 |
| 7,092,216 B1* | 8/2006 | Chang et al. ............. | 360/265.9 |
| 2001/0033461 A1* | 10/2001 | Koester et al. ........... | 360/265.7 |
| 2002/0018321 A1* | 2/2002 | Utsunomiya ............. | 360/265.7 |

FOREIGN PATENT DOCUMENTS

| JP | 06-251518 | 9/1994 |
|---|---|---|
| JP | 11-068773 | 3/1999 |
| JP | 2000-090603 | 3/2000 |

* cited by examiner

*Primary Examiner*—Mark Blouin
(74) *Attorney, Agent, or Firm*—Townsend and Townsend and Crew LLP; Darren Gold (57) ABSTRACT

Embodiments of the invention improve the impact-resisting performance of a disk drive. In a head actuator assembly according to an embodiment of the invention, the difference in resonance frequency between an arm bending mode and a coil bending mode is set at a predetermined value or less. Since there is a phase difference between these two modes, an oscillation gain in the arm bending mode can be greatly decreased by approximating the two resonance frequencies to each other. Consequently, it is possible to suppress collision of a head with a recording disk caused by an external shock and thereby improve the impact-resisting performance of a disk drive.

16 Claims, 5 Drawing Sheets

DISK DRIVE, AND ACTUATOR AND HEAD ACTUATOR ASSEMBLY

CROSS-REFERENCES TO RELATED APPLICATIONS

This application claims priority from Japanese Patent Application No. JP2004-371239, filed Dec. 22, 2004, the entire disclosure of which is incorporated herein by reference.

BACKGROUND OF THE INVENTION

The present invention relates to a disk drive, as well as an actuator and a head actuator assembly used in the disk drive.

Data storage devices using various types of media such as optical disks and magnetic tapes are known. Among them, hard disk drives (hereinafter referred to as HDDs) have become popular as storage devices for computers to such an extent that they are one type of the storage devices indispensable for today's computers. Further, not limited to computer systems, HDDs are expanding more and more in application because of its excellent characteristics. For example, HDDs are used for moving picture recording/reproducing devices, car navigation systems, cellular phones, and removable memories for use in digital cameras.

Each magnetic disk used in HDDs has a plurality of tracks formed concentrically and each track is divided into a plurality of sectors. Servo data and user data are stored in each of the sectors. A spindle motor rotates the magnetic disk and a head element as a thin film element makes access to a desired address position in accordance with the servo data stored in a sector, whereby it is possible to effect write or read of data to or from the magnetic disk.

The head element is fixed to a slider, both constituting a head. The slider is adapted to fly over a rotating magnetic disk, whereby the head or the head element can be moved to a desired position over the magnetic disk. In a data read operation, a signal read from the magnetic disk by the head element is subjected to predetermined signal processing such as waveform shaping or decoding in a signal processing circuit and is then sent to a host. Data transferred from the host is subjected to predetermined signal processing in the signal processing circuit and is then written to the magnetic disk.

In HDD, not only vibrations caused by rotation of the magnetic disk pose a problem (see, for example, Patent Document 1 (Japanese Patent Laid-open No. 10-320964)), but also satisfactory impact resistance to collision with an external object is required. As mentioned above, since the HDD is mounted in various products, it is required to exhibit impact-resisting performance appropriate for the product in which it is mounted. In particular, when mounted in a portable product such as a laptop PC or a digital camera, the HDD is required to possess high-impact resistance. In the actual manufacture of products, the HDD or an HDD-mounted product is dropped onto a floor surface to check the impact-resisting performance of the HDD.

On the other hand, downsizing of the slider is being promoted from the standpoint of reducing the size of the HDD, increasing the surface recording density, reducing the cost and improving the seek speed. The slider size is defined by IDEMA (International Disk Drive Equipment and Materials Association) Standards. More particularly, in descending order of size, mini sliders, micro sliders, nano sliders, pico sliders, and femto sliders are defined. Although pico sliders are most popular in the existing HDDs, it is presumed that femto sliders will be used in a larger number of HDDs in future.

BRIEF SUMMARY OF THE INVENTION

Having studied the impact resistance of the HDD using a femto slider, the present inventors found out that a hardware error occurred which has not been recognized in the conventional pico slider. More specifically, a magnetic disk was found to be flawed by a drop impact. As a result of extensive studies it turned out that there occurred vibrations of a spindle motor by collision of HDD with a floor surface and that a magnetic disk was flawed by collision of a slider therewith. It is probable that since the flying height of the femto slider is small, the problem caused by collision of the slider with the magnetic disk, which is attributable to an external shock, has been actualized.

To prevent collision between the head (slider) and the magnetic disk it is considered effective to decrease the oscillation gain of an arm section of an actuator which holds a head. The oscillation gain of the arm section can be decreased by increasing the thickness of the arm section, enlarging the shape thereof, or using a material of a high specific gravity, to enhance the rigidity thereof. However, these methods lead to an increase in inertia of the actuator, resulting in an increase in the seek time. In particular, in HDDs of 2.5 inches or less used in mobile devices, it is difficult to increase the weight of the arm section because importance is attached to the reduction of size and weight.

The present invention has been accomplished with the above circumstances as background and it is a feature of the invention to improve the impact-resisting performance of a disk drive.

In one aspect of the present invention there is provided an actuator adapted to move pivotally to position a head over a rotating recording disk in a disk drive, comprising a suspension section having a front end portion to which the head is fixed, an arm section connected to the suspension section on the side thereof opposite to the front end portion of the suspension section, a bearing section connected to the arm section on the side thereof opposite to the suspension section and having an aperture adapted to fit a pivot shaft therein, and a coil support section connected to the bearing section on the side thereof opposite to the arm section, the coil support section holding a coil on an inner periphery side thereof, a thickness of the inner periphery for holding the coil being smaller than that of the coil. By thinning the coil support section, a resonance frequency in a coil bending mode and a resonance frequency in an arm bending mode, in the direction of the pivot shaft, can be approximated to each other and the gain in the arm bending mode can be decreased.

Preferably, in a fixed state of the head to the suspension section and in the direction of the pivot shaft, a difference between a resonance frequency in a coil bending mode and a resonance frequency in an arm bonding mode is about 800 Hz or less. As a result, the gain in the arm bending mode can be greatly decreased.

Preferably, a slit is formed in a portion, of the bearing section, on the side of the coil support section so as to extend substantially perpendicularly to and toward the pivot shaft. As a result, the resonance frequency in the coil bending mode and that in the arm bending mode can be approximated to each other while ensuring a required thickness of the coil support portion.

In another aspect of the present invention there is provided a head actuator assembly comprising a head adapted to access a recording disk and an actuator adapted to move pivotally to position the head over a rotating magnetic disk, further comprising a suspension section which holds the head at a front end portion thereof, an arm section connected to the suspension section on the side thereof opposite to the head, a bearing section connected to the arm section on the side thereof opposite to the suspension section and having an aperture adapted to fit a pivot shaft therein, a coil support section connected to the bearing section on the side thereof opposite to the arm section, and a coil fixed to an inner periphery of the coil support section, wherein, in the direction of the pivot shaft, a difference between a resonance frequency in a coil bending mode and a resonance frequency in an arm bending mode is about 1050 Hz or less. By setting the difference between the resonance frequency in the coil bending mode and that in the arm bending mode in the direction of the pivot shaft at about 1050 Hz or less, it is possible to greatly decrease the gain in the arm bending mode.

Preferably, a thickness of the coil holding inner periphery of the coil support section is smaller than that of the coil. Alternatively it is preferable that a slit be formed in a portion, of the bearing section, on the side of the coil support section so as to extend substantially perpendicularly to and toward the pivot shaft. According to this construction, the resonance frequency in the coil bending mode and that in the arm bending mode can be approximated to each other.

Preferably, a difference between a resonance frequency in a coil bending mode and a resonance frequency in an arm bending mode, in the direction of the pivot shat, is about 800 Hz or less. Further, preferably, the difference between a resonance frequency in a coil bending mode and a resonance frequency in an arm bending mode, in the direction of the pivot shaft, is about 500 Hz or less.

In a further aspect of the present invention there is provided a disk drive comprising a base, a motor rotating a recording disk, the motor being fixed within the base, and a head actuator assembly comprising a head adapted to access the recording disk and an actuator adapted to move pivotally to position the head over the recording disk which is rotating. The head actuator assembly further comprises a suspension section which holds the head at a front end portion thereof, an arm section connected to the suspension section on the side thereof opposite to the front end portion of the suspension section, a bearing section connected to the arm section on the side thereof opposite to the suspension section and having an aperture adapted to fit a pivot shaft therein, a coil support section connected to the bearing section on the side thereof opposite to the arm section, and a coil fixed to an inner periphery surface of the coil support section, wherein, in the direction of the pivot shaft, a difference between a resonance frequency in a coil bending mode and a resonance frequency in an arm bending mode is about 1050 Hz or less.

In a still further aspect of the present invention there is provided a disk drive comprising a base, a motor for rotating a recording disk, the motor being fixed within the base, and a head actuator assembly comprising a head adapted to access the recording disk and an actuator adapted to move pivotally to position the head over the recording disk which is rotating. The head actuator assembly further comprises a suspension section having a front end portion to which the head is fixed, an arm section connected to the suspension section on the side thereof opposite to the front end portion of the suspension section, a bearing section connected to the arm section on the side thereof opposite to the suspension section and having an aperture adapted to fit a pivot shaft therein, and a coil support section connected to the bearing section on the side thereof opposite to the arm section and fixing a coil to an inner periphery thereof, a thickness of the coil-fixed inner periphery being smaller than that of the coil.

In a further aspect of the present invention there is provided a disk drive comprising a base, a motor for rotating a recording disk, the motor being fixed within the base, and a head actuator assembly comprising a head adapted to access the recording disk and an actuator adapted to move pivotally to position the head over the recording disk which is rotating. The head actuator assembly further comprises a suspension section having a front end portion to which the head is fixed, an arm section connected to the suspension section on the side thereof opposite to the front end portion of the suspension section, a bearing section connected to the arm section on the side thereof opposite to the suspension section and having an aperture adapted to fit a pivot shaft therein, and a coil support section connected to said bearing section on the side thereof opposite to the arm section and fixing a coil to an inner periphery thereof, wherein a slit is formed in a portion, of the bearing section, on the side of the coil support section so as to extend substantially perpendicularly to and toward the pivot shaft. With the slit, a resonance frequency in a coil bending mode and a resonance frequency in an arm bending mode, in the direction of the pivot shaft, can be approximated to each other, whereby the gain in the arm bending mode can be made small and it is possible to improve the impact-resisting performance of the disk drive.

Preferably, the slit extends from end to end in a pivoting direction of the coil support section. Alternatively, it is preferable that the slit be formed on both sides of the coil support section in the direction of the pivot shaft. According to these constructions, the resonance frequency in the coil bending mode and that in the arm bending mode can surely be approximated to each other.

Preferably, the thickness of the coil support section is smaller than that of the coil. By a combination of this construction with the slit it is possible to surely approximate the resonance frequency in the coil bending mode and that in the arm bending mode to each other. Preferably, the difference between the resonance frequency in the coil bending direction and that in the arm bending direction, in the direction of the pivot shaft, is about 800 Hz or less. As a result, it is possible to greatly decrease the gain in the arm bending mode.

According to the present invention it is possible to improve the impact-resisting performance of a disk drive.

DETAILED DESCRIPTION OF THE INVENTION

Specific embodiments to which the present invention is applicable will be described hereinunder. In the following description and the drawings, omissions and simplifications are made as necessary for the clarification of explanation. In the drawings, the same elements are identified by the same reference numerals, and tautological explanations will be omitted as necessary for the clarification of explanation.

Figure 1:
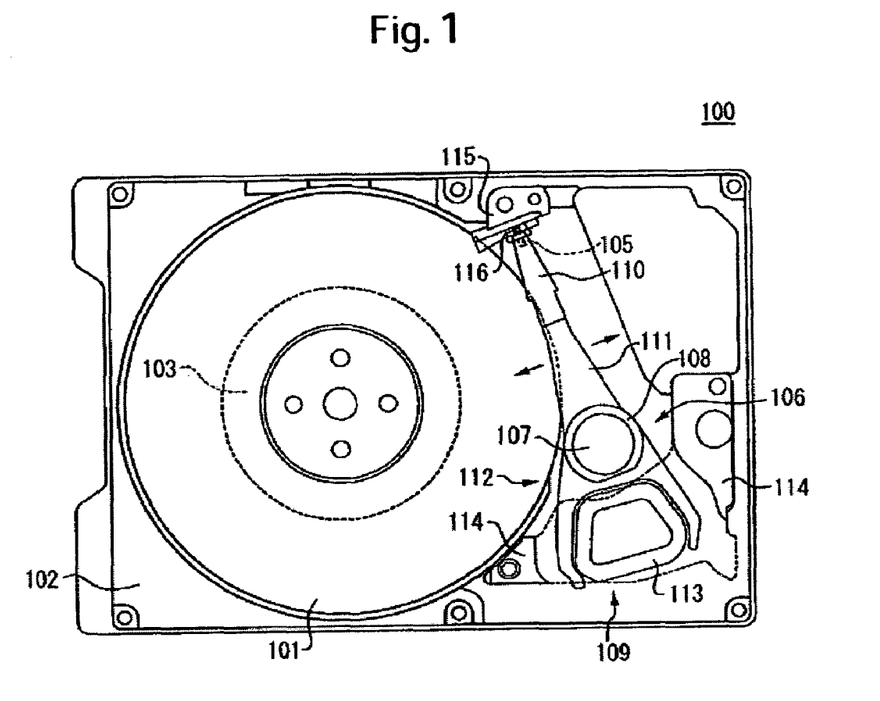
FIG. 1 is a plan view showing schematically the entire construction of an HDD according to an embodiment of the present invention.

An embodiment of the present invention will be described in detail with reference to the drawings. The present invention relates to an actuator structure in a disk drive. For ease of understanding of the present invention, reference will first be made to an entire construction of a hard disk drive (HDD) as an example of a disk drive. FIG. 1 is a plan view showing schematically the construction of an HDD 100 according to this embodiment. In the same figure, numeral 101 denotes a recording medium for the storage of data. The recording medium 101 is a non-volatile magnetic disk wherein data are stored by magnetization of a magnetic layer. Numeral 102 denotes a base on which are accommodated various constituent elements of the HDD 100. The base 102 is fixed through a gasket (not shown) to a cover (not shown) which covers an upper opening of the base, thereby constituting a disk enclosure which can accommodate the constituent elements of the HDD 100 in a hermetically sealed state.

The magnetic disk 101 is fixed to a spindle motor 103. The spindle motor 103 rotates the magnetic disk 101 at a predetermined speed. A head 105 comprises a slider and a head element as a conversion element fixed to the surface of the slider. The head element writes and/or reads data to and/or from the magnetic disk 101 which data are inputted and outputted between the head element and a host (not shown). The head element has a write element for converting an electric signal into a magnetic field in accordance with data to be stored to the magnetic disk 101 and/or a read element for converting a magnetic field provided from the magnetic disk 101 into an electric signal.

An actuator 106 is held pivotably by a pivot shaft 107 and is driven by a VCM (Voice Coil Motor) 109. The actuator 106 holds the head 105 and is adapted to move pivotally, thereby carrying the head to a desired position over the magnetic disk 101. A head actuator assembly is constituted by the actuator 106 and the head 105. The actuator 106 includes constituent elements, i.e., a suspension section 110, an arm section 111, a fitting section 108 for fitting the pivot shaft 107 therein, a coil support section 112, and a flat coil 113, in this order successively from a front end portion of the actuator where the head 105 is disposed. Incidentally, the construction of the actuator 106 will be detailed later.

Numeral 114 denotes an upper stator magnet holding plate fixed to the base 102. In the drawing, a principal portion of the upper stator magnet holding plate 114 is cut away for convenience and the profile thereof is indicated by a broken line. Although not shown, a lower stator magnet holding plate 113 is disposed below the flat coil 113 so as to sandwich the flat coil between the lower and upper stator magnetic holding plates 113 and 114. The VCM 109 includes the flat coil 113, a stator magnet (not shown) fixed to the upper stator magnet holding plate 114, and a stator magnet (not shown) fixed to the lower stator magnet holding plate.

Numeral 115 denotes a ramp used for unloading of the head 105 from the magnetic disk 101 when the rotation of the magnetic disk stops. Numeral 116 denotes a tab formed at a front end portion of the suspension section 110. The actuator 106 used in this embodiment is also applicable to the CSS (Contact Start and Stop) system wherein, when the head 105 performs neither data write nor read processing, it is unloaded to a zone formed on the inner periphery side of the magnetic disk 101.

The HDD 100 may have one or a plurality of stacked magnetic disks 101. In the case where the HDD 100 is provided with plural magnetic disks 101, the spindle motor 103 holds the plural magnetic disks integrally at predetermined spacings in its rotational axis direction. Typically, data are stored on both surfaces of each magnetic disk 101, but may be stored on only one surface of each magnetic disk.

When the HDD 100 is in operation, the spindle motor 103 rotates the magnetic disk 101 at a predetermined speed. When the HDD 100 is not in operation, the magnetic disk 101 is at a standstill. In accordance with a drive signal applied to the flat coil 113 from a controller (not shown) the VCM 109 moves the actuator 106 pivotally about the pivot shaft 107, causing the head 105 to move over the magnetic disk 101. Alternatively, the head 105 can be moved to outside the magnetic disk 101.

To read or write data from or to the magnetic disk 101, the actuator 106 moves the head 105 to a position over a data area on the surface of the rotating magnetic disk 101. As the actuator 106 moves pivotally, the head 105 moves in the radial direction of the surface of the magnetic disk 101, whereby the head 105 (head element) can make access to a desired track. When pressure induced by the viscosity of air present between an ABS (Air Bearing Surface) of the slider opposed to the magnetic disk 101 and the rotating magnetic disk balances with pressure applied toward the magnetic disk 101 by the suspension section 110, the head 105 flies over the magnetic disk 101 at a certain gap.

When the rotation of the magnetic disk 101 stops, the actuator 106 causes the head 105 to be unloaded to the ramp 115 from the data area. As the actuator 106 moves pivotally toward the ramp 115, the tab 116 at the front end of the actuator slidably moves on a slope of the ramp 115 and gets on a parking surface on the ramp 115, whereby unloading of the head 105 is completed. For loading of the head, the actuator 106 which has been supported on the parking surface leaves the ramp 115 and moves to a position over the surface of the magnetic disk 101.

Figure 2:
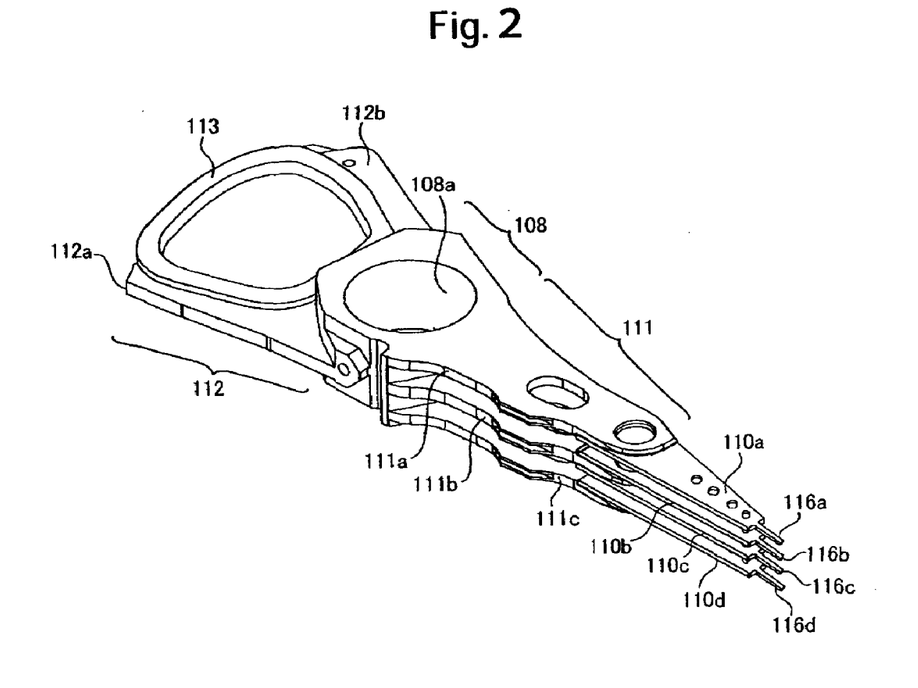
FIG. 2 is a perspective view showing the entire construction of a head actuator assembly used in the HDD of the embodiment.

The details of the actuator 106 used in this embodiment will now be described. FIG. 2 is a perspective view showing the schematic construction of the actuator 106. The actuator 106 is provided with the head 105 and the suspension section 110 associated with each recording surface of each magnetic disk 101. The actuator 106 is further provided with a plurality of the arm sections 111 to each of which one or two suspensions are connected. The actuator 106 shown in FIG. 2 has a construction appropriate for two magnetic disks 101 of a double-surface recorded type. The suspension sections 110 and arm sections 111 are disposed at positions where they lie one upon another at predetermined spacings. Typically, the arm sections 111 and suspension sections 110 are formed of stainless steel or aluminum.

More specifically, the actuator 106 includes three stacked arm sections 111a to 111c and four stacked suspension sections 110a to 110d. The suspension sections 110a to 110d are provided at their front ends with tabs 116a-116d, respectively. The arm sections 111 are connected to the suspension sections 110 on the side opposite to the front ends (tabs 116) of the suspension sections 110. The magnetic disks 101 are respectively positioned between the arm sections 111a and 111b and between the arm sections 111b and 111c. Heads 105 (not shown) are fixed respectively to the suspension sections 110a to 110d on the side opposed to the magnetic disks 101.

Suspension sections 110a and 110d are connected to top and bottom arm sections 111a and 111c, respectively. Suspension sections 110b and 110c are connected respectively to both surfaces of a middle arm section 111b. The arm sections 111 and the suspension sections 110 can be connected together, for example, by laser spot welding or swaging. The arm sections 111a to 111c are connected to the bearing section 108 on the side opposite to the suspension sections 110a to 110d. Although in this embodiment the arm sections 111 and the bearing section 108 are formed integrally with each other, these sections may be formed separately from each other.

A fitting hole 108a to fit the pivot shaft 107 therein is formed in the bearing section 108. The coil support section 112 is connected to the bearing section 108 on the side opposite to the arm sections 111. In this embodiment the bearing section 108 and the coil support section 112 are formed integrally with each other. Thus, the arm sections 111, the bearing section 108 and the coil support section 112 are formed as one member.

The coil support section 112 holds the flat coil 113 on an inner periphery surface thereof. The flat coil 113 is fixed with resin to the inner periphery surface of the coil support section 112. The flat coil 113 is coiled so as to surround the pivot shaft direction (the vertical direction in FIG. 2). That is, the flat coil 113 is coiled along the inner periphery surface of the coil support section 112. Further, the flat coil 113 is formed in a trapezoidal shape so that the side thereof on the fitting section 108 is a short side and the side opposite thereto is a long side.

The coil support section 112 comprises two coil support arm sections 112a and 112b. The coil support arm portions 112a and 112b extend backward of the actuator 106 (to the side opposite to the arm sections 111) from the bearing section 108 in a direction perpendicular to the pivot shaft. The coil support arm sections 112a and 112b hold the flat coil 113 grippingly on the side opposite to the arm sections 111 with respect to the bearing section 108. The coil support arm sections 112a and 112b are formed so that their distal ends, i.e., their ends on the side opposite to the arm sections 111, are spaced away from each other. In FIG. 2, therefore, the flat coil 113 is exposed behind the actuator 106 (on the side opposite to the fitting section 108). The distal ends of the two coil support arm sections 112a and 112b may be connected with each other.

The head actuator assembly includes a plurality of bending modes in the direction (Z direction) of the pivot shaft. One of them is an arm bending mode induced by the primary bending mode of the arm sections 111 and the other is a coil bending mode induced by the primary resonance of the flat coil 113. Since the flat coil 113 is fixed to the inner periphery surface of the coil support section 112, the primary resonance of the flat coil 113 is the same as that of the coil support section 112. The head actuator assembly used in this embodiment is designed in such a manner that the resonance frequency in the arm bending mode and the resonance frequency in the coil bending mode approximate to each other. More specifically, the head actuator assembly is constructed so that, in a fixed state of the head 105 to the actuator 106, the difference in resonance frequency between the arm bending mode and the coil bending mode becomes a predetermined value or less. As a result, the gain in the arm bending mode can be greatly decreased.

When an external shock is given to the HDD 100, an arm bending mode with a large gain is developed and each of the arm sections 111 oscillates largely. Consequently, each head 105 oscillates largely in the direction of the pivot shaft. Thus, if an external shock is given while the head 105 is accessing the associated magnetic disk 101 and is flying over the recording surface of the magnetic disk 101, the head deflects largely in the developed arm bending mode and strikes against the magnetic disk, causing damage to the recording surface of the disk, with consequent occurrence of a hardware error. This problem is serious particularly in an HDD which uses a femto slider of a low flying height.

Figure 3:
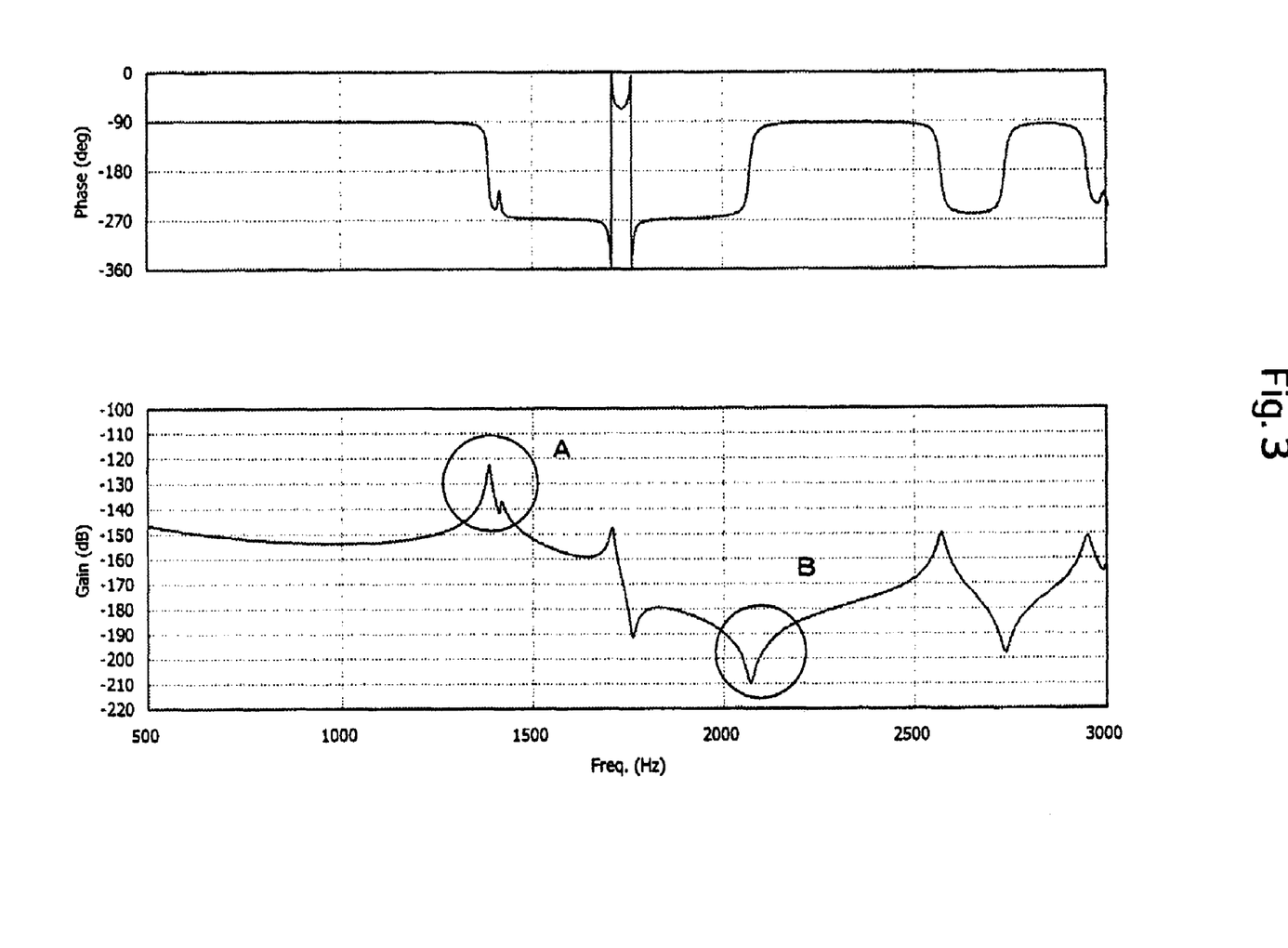
FIG. 3 is a graph showing a relationship among the oscillation gain, frequency and phase of an arm section in the head actuator assembly.

In the oscillation of each arm section 111, the way of phase advance is reverse (antiphase) between the arm bending mode and the coil bending mode. More particularly, the phase of oscillation of each arm section 111 lags in the arm bending mode, but leads in the coil bending mode. FIG. 3 is a graph showing an example of measurement by simulation of oscillation gain and phase of each arm section 111. The head actuator assembly was set to a shaking machine and was oscillated in the direction of the pivot shaft while changing the frequency. In this way the arm section was measured for oscillation. A large gain means a large oscillation with respect to applied oscillation.

In FIG. 3, the portion indicated at A corresponds to the arm bending mode and the portion indicated at B corresponds to the coil bending mode. An extremely large gain is recognized in the resonance frequency of the arm bending mode. It is seen that the phase in the arm bending mode lags, while the phase of oscillation of the arm section in the coil bending mode is leading.

Thus, since the arm bending mode and the coil bending mode are opposite in phase, by approximating the resonance frequency in the coil bending mode to the resonance frequency in the arm bending mode, the gain in the arm bending mode can be greatly decreased. Consequently, the maximum oscillation amplitude of the arm section 111 against an external shock can be decreased to a great extent and it is possible to prevent collision of each arm section 111 against an external shock and improve the impact resistance during operation of the HDD 100.

Figure 4:
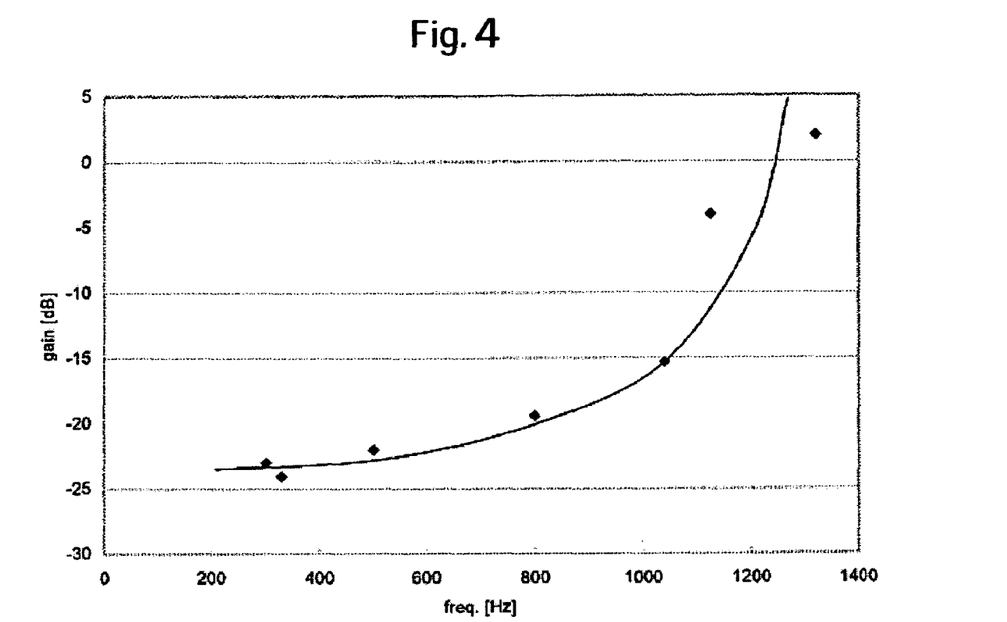
FIG. 4 is a graph showing the difference in resonance frequency between an arm bending mode and a coil bending mode in the head actuator assembly versus an oscillation gain of the arm section.

FIG. 4 is a graph showing the difference in resonance frequency between the arm bending mode and the coil bending mode versus the oscillation gain of each arm section in the arm bending mode. There were provided a plurality of head actuator assemblies having the construction shown in FIG. 2 and having different resonance frequency differences between the two modes. Each sample was measured for oscillation gain in the arm bending mode. The measurement of oscillation gain was performed for the arm section corresponding to the top arm section 111a in each sample.

As shown in FIG. 4, as the resonance frequencies in two modes are approximated to each other, the gain in the arm bending mode drops sharply to about 1050 Hz. Thereafter, the gain decreases gradually and then decreases in a gentle manner from about 800 Hz. The gain assumes a nearly constant value at about 500 Hz or less and exhibits the lowest value at 330 Hz. From these results it is seen that, to greatly decrease the gain in the arm bending mode, the difference in resonance frequency between the arm bending mode and the coil bending mode is preferably about 1050 Hz or less, more preferably about 800 Hz or less. To further ensure a satisfactory impact-resisting performance during operation of the HDD, it is preferable that the resonance frequency difference be about 500 Hz or less.

Further, there were provided two HDDs having resonance frequency differences in two modes of 1125 Hz and 300 Hz, respectively, and an impact resistance test in operation was conducted. The results obtained are as shown in the following table. In the table, 2 ms, 1 ms, and 0.5 ms each represent the time of contact with a collision surface, and each G level represents a G level just before occurrence of a hardware error of each HDD. As is seen from the table, by approximating the resonance frequencies in two modes to each other (300 Hz), the impact-resisting performance of the HDD concerned exhibited a remarkable improvement. In particular, at 0.5 ms, a great improvement of impact-resisting performance corresponding to an increase of 125 G was obtained.

TABLE 1

|  | 2 ms | 1 ms | 0.5 ms |
|---|---|---|---|
| Arm-coil: 1125 Hz | 275 G | 200 G | 100 G |
| Arm-coil: 300 Hz | 300 G | 175 G | 225 G |

In the case where the head actuator assembly is provided with plural arm sections, the arm sections may have different resonance frequencies in the arm bending mode. By approximating two resonance frequencies to each other with respect to a specific arm section it is possible to improve the impact resistance during operation of the HDD 100, but it is preferable that the frequency difference be within the above range in an arm section having the greatest difference in resonance frequency between the two modes. In the stage of design, it is preferable to take note of an arm section having the largest gain in the arm bending mode and set the resonance frequency in the arm bending mode and that in the coil bending mode in each arm section so that the gain of the said arm section becomes a predetermined value or less.

No matter which of the resonance frequencies in the two modes may be the higher, it is possible to decrease the gain in the arm bending mode. That is, the resonance frequency in the coil bending mode may be lower than that in the arm bending mode.

Thus, the amplitude of each arm section 111 with respect to impact can be greatly lowered by approximating the resonance frequency in the arm bending mode and the resonance frequency in the coil bending mode to each other. To approximate the two resonance frequencies to each other it is necessary to either raise the resonance frequency in the arm bending mode or lower the resonance frequency in the coil bending mode. For example, the resonance frequency in the arm bending mode can be raised by thickening the arm section. However, it is necessary to design the arm section appropriately from the standpoint of holding of the suspension and seek performance, and thus it is preferable that the resonance frequencies be approximated to each other without any important alteration in the design of the arm section.

Figure 5:
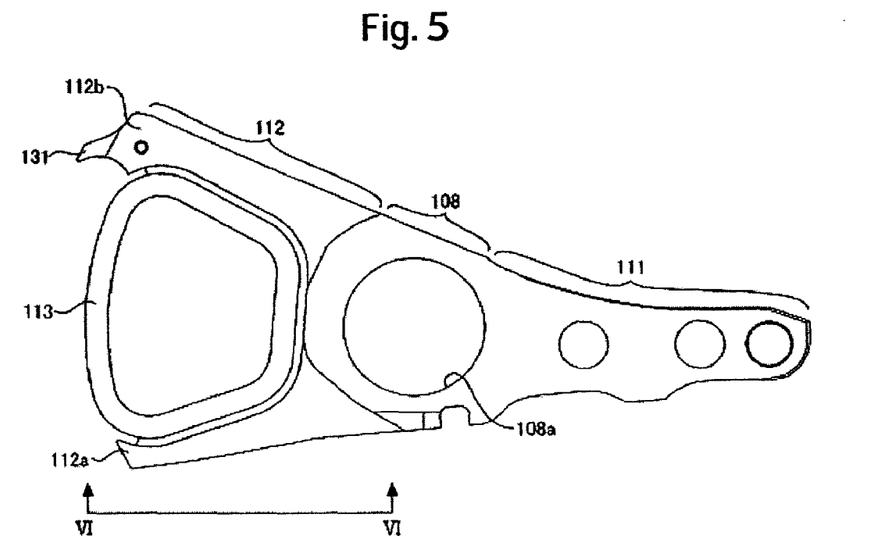
FIG. 5 is a plan view showing the shape of a flat coil and that of a coil support section in the head actuator assembly.
Figure 6:
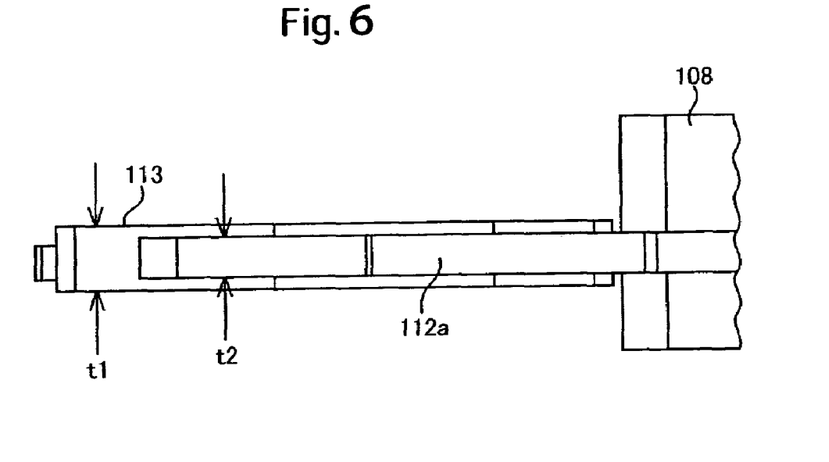
FIG. 6 is a side view showing the shape of a flat coil and that of a coil support section in the head actuator assembly.

In this embodiment, the resonance frequencies in the two modes are approximated to each other by lowering the resonance frequency in the coil bending mode. This lowering of the resonance frequency can be done by adopting such a structure as to facilitate oscillation of the flat coil 113, i.e., the coil support section 112. Thinning the coil support section 112 is one of the preferred methods. More specifically, the coil support section 112 is made thinner than the flat coil 113. FIGS. 5 and 6 show a partial construction of an actuator 106 provided with a thin coil support section 112. FIG. 5 is a plan view showing the structure of each of an arm section 111, a fitting section 108, a coil support section 112, and a flat coil 113. In the same figure, a projecting portion 131 connected to the distal end of the coil support arm portion 112b is a portion adapted for engagement with a latch mechanism provided within the HDD 100. FIG. 6 is a side view of the portion indicated by line VI-VI in FIG. 5.

As shown in FIG. 6, the thickness t2 of the coil support section 112 is smaller than the thickness t1 of the flat coil 113. The flat coil 113 projects from both upper and lower surfaces of the coil support section 112 (both surfaces perpendicular to the pivot shaft direction). Usually, in order to hold the flat coil 113 positively, the inner periphery surface of the coil support section 112 to which the flat coil 113 is fixed is thicker than the flat coil 113. In this embodiment, however, the thickness of the inner periphery surface of the coil support section 112 is smaller than the thickness of the flat coil 113 in order to reduce the resonance frequency in the coil bending mode.

The coil support arm sections 112a and 112b may be formed with small convex portions or the like and the inner periphery surfaces thereof may be made thicker only partially than the flat coil 113. But substantially the inner periphery surfaces of the coil support arm portions 112a and 112b are each formed in uniform thickness. Thus, the inner periphery surfaces are each formed so that the thickness thereof, substantially throughout the whole thereof, is smaller than the thickness of the flat coil 113. In this embodiment, the coil support arm portions 112a and 112b are formed so as to be equal in thickness substantially throughout the whole thereof and therefore the maximum thickness of the coil support portion 112 is smaller than the thickness of the flat coil 113. The coil support arm portions 112a and 112b may be formed so as to be different in thickness from each other.

By thus forming the coil support section 112 thinner than the flat coil 113 it is possible to lower the resonance frequency in the coil bending mode. As a result, it is possible to approximate the resonance frequency in the arm bending mode and that in the coil bending mode to each other, thereby lower the gain in the arm bending mode and improve the impact-resisting performance of the HDD.

Figure 7:
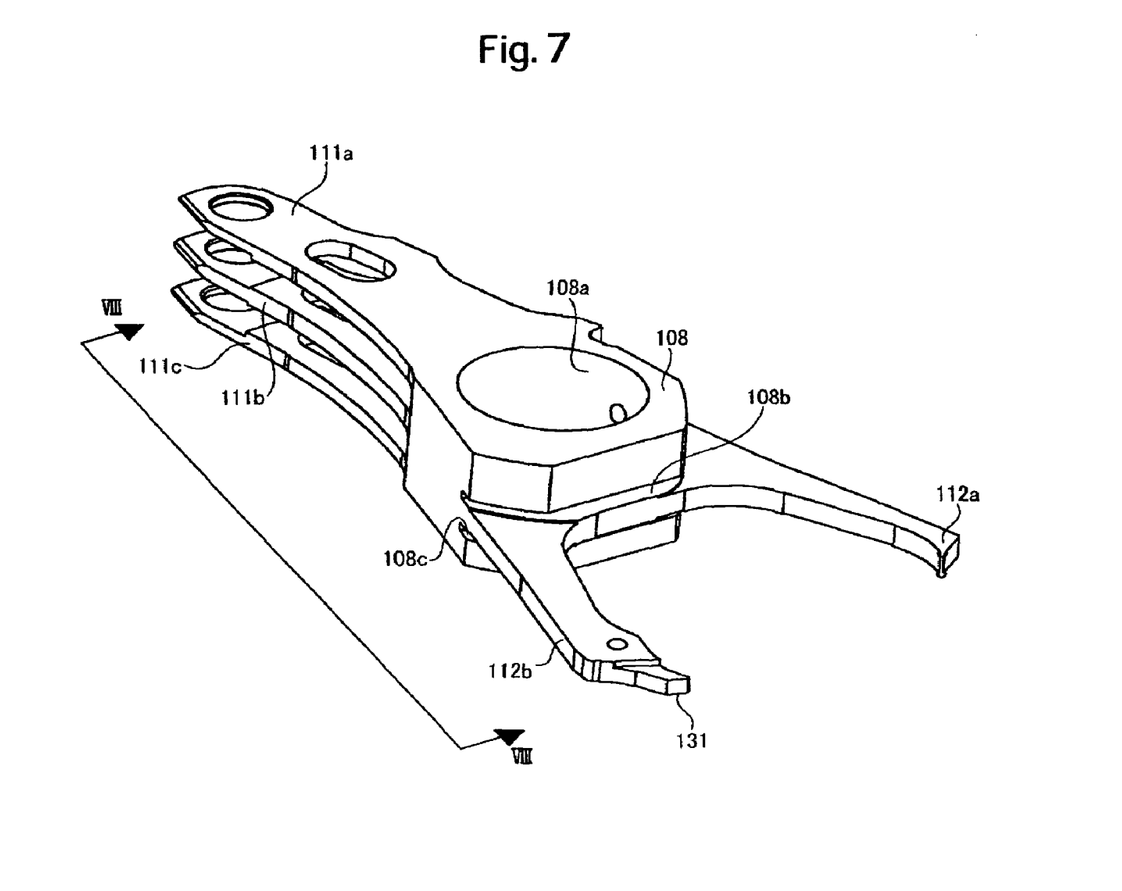
FIG. 7 is a perspective view showing slits formed in a fitting section in the head actuator assembly.
Figure 8:
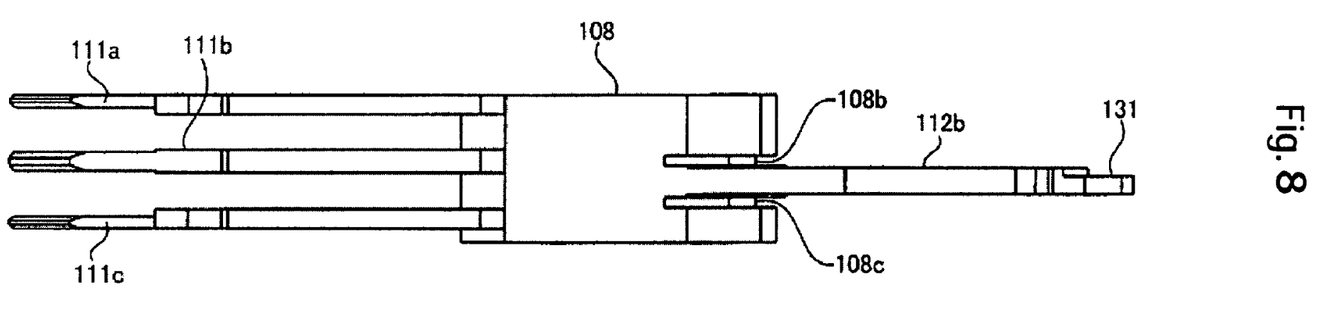
FIG. 8 is a side view showing the slits formed in the fitting section in the head actuator assembly.

Another method for lowering the resonance frequency in the coil bending mode is to form slits in the portions of the fitting section 108 on the side of the coil support section 112. FIG. 7 is a perspective view showing the structure of the fitting portion 108 formed with slits and of the coil support section 112. FIG. 8 is a side view of the portion indicated by line VIII-VIII in FIG. 7. As shown in FIG. 7, slits 108b and 108c are formed in the portions of the fitting portion 108 on the side of the coil support section 112. To lower the resonance frequency in the coil bending mode effectively, it is preferable that slits 108b and 108c be formed on both vertical sides of the coil support section 112, in other words, on both sides of the coil support section 112 in the pivot shaft direction, as shown in FIG. 8.

As shown in FIG. 7, the slits 108b and 108c are recessed toward the pivot shaft (the fitting hole 108a or the arm section 111) in the surface of the fitting section 108 on the side of the coil support section 112. The slits 108b and 108c extend so as to connect the coil support arm sections 112a and 112b with each other in a direction substantially perpendicular to the pivot shaft direction. In the illustrated example, the slits 108b and 108c are formed from an end of the fitting section 108 corresponding to an outer side face of the coil support arm section 112a up to an end of the fitting portion 108 corresponding to an outer side face of the coil support arm section 112b. Since the slits 108b and 108c are thus formed from end to end in the pivoting direction of the coil support section 112, it is possible to lower the resonance frequency of the coil support section 112 effectively.

By thus forming the slits 108b and 108c in the connection between the fitting portion 108 and the coil support section 112 it is possible to lower the resonance frequency in the coil bending mode. As a result, it is possible to improve the impact-resisting performance of the HDD. In designing the actuator, it is necessary that an entire centroidal position be coincident with the pivot shaft axis. Forming the slits 108b and 108c in the fitting portion 108 is preferable from the standpoint of centroid design because a change of centroid is smaller than in the case of thinning the coil support section 112.

According to the HDD of this embodiment, as described above, it is possible to diminish the oscillation amplitude of the head with respect to an external shock and suppress the occurrence of a hardware error caused by collision of the head with the magnetic disk. In particular, the head actuator assembly according to this embodiment is particularly effective in an HDD provided with a femto slider of a small flying height and further in an HDD mounted on a mobile device for which high-impact resistance is required.

Although the present invention has been described above by way of the embodiments thereof, the present invention is not limited to the above embodiments. Any person skilled in the art can easily make changes, additions or conversions within the scope of the present invention with respect to the constituent elements described in the above embodiments. For example, the present invention is also applicable to a disk drive which uses a recording disk other than the magnetic disk and is further applicable to a disk drive which performs only read.

What is claimed is:

1. An actuator adapted to move pivotally to position a head over a rotating recording disk in a disk drive, comprising:
    a suspension section having a front end portion to which the head is fixed;
    an arm section connected to said suspension section on a side opposite to the front end portion of the suspension section;
    a bearing section connected to said arm section on a side opposite to said suspension section and having an aperture adapted to fit a pivot shaft therein; and
    a coil support section connected to said bearing section on a side opposite to said arm section, said coil support section holding a coil on an inner periphery side thereof, a thickness of the inner periphery adapted to hold the coil being smaller than a thickness of the coil,
    wherein a first and a second slit are formed in a portion of said bearing section, on the side of said coil support section so as to extend substantially perpendicularly to and toward said pivot shaft, wherein the first slit is formed in a plane parallel to the top surface of the coil support section, and the second slit is formed in a plane parallel to the bottom surface of the coil support section.

2. An actuator according to claim 1, wherein, in a fixed state of the head to said suspension section and in the direction of said pivot shaft, a difference between a resonance frequency in a coil bending mode and a resonance frequency in an arm bending mode is about 800 Hz or less.

3. A head actuator assembly comprising a head configured to access a recording disk and an actuator configured to move pivotally to position the head over a rotating recording disk, further comprising:
    a suspension section which holds said head at a front end portion thereof;
    an arm section connected to said suspension section on a side thereof opposite to said head;
    a bearing section connected to said arm section on a side thereof opposite to said suspension section and having an aperture adapted to fit a pivot shaft therein;
    a coil support section connected to said bearing section on a side thereof opposite to said arm section; and
    a coil fixed to an inner periphery of said coil support section;

wherein, in the direction of said pivot shaft, a difference between a resonance frequency in a coil bending mode and a resonance frequency in an arm bending mode is about 1050 Hz or less, and wherein a first and a second slit are formed in a portion of said bearing section, on the side of said coil support section so as to extend substantially perpendicularly to and toward said pivot shaft, wherein the first slit is formed in a plane parallel to the top surface of the coil support section, and the second slit is formed in a plane parallel to the bottom surface of the coil support section.

4. A head actuator assembly according to claim 3, wherein a thickness of the coil holding inner periphery of said coil support section is smaller than a thickness of said coil.

5. A head actuator assembly according to claim 3, wherein, in the direction of said pivot shaft, a difference between a resonance frequency in a coil bending mode and a resonance frequency in an arm bending mode is about 800 Hz or less.

6. A head actuator assembly according to claim 3, wherein, in the direction of said pivot shaft, a difference between a resonance frequency in a coil bending mode and a resonance frequency in an arm bending mode is about 500 Hz or less.

7. A disk drive comprising:
    a base;
    a motor for rotating a recording disk, said motor being fixed within said base; and
    a head actuator assembly comprising a head configured to access said recording disk and an actuator configured to move pivotally to position the head over the recording disk which is rotating,
    said head actuator assembly further comprising:
    a suspension section which holds said head at a front end portion thereof;
    an arm section connected to said suspension section on a side thereof opposite to the front end portion of said suspension section;
    a bearing section connected to said arm section on a side thereof opposite to said suspension section and having an aperture adapted to fit a pivot shaft therein;
    a coil support section connected to said bearing section on a side thereof opposite to said arm section; and
    a coil fixed to an inner periphery surface of said coil support section;
    wherein, in the direction of said pivot shaft, a difference between a resonance frequency in a coil bending mode and a resonance frequency in an arm bending mode is about 1050 Hz or less, and
    wherein a first and a second slit are formed in a portion of said bearing section, on the side of said coil support section so as to extend substantially perpendicularly to and toward said pivot shaft, wherein the first slit is formed in a plane parallel to the top surface of the coil support section, and the second slit is formed in a plane parallel to the bottom surface of the coil support section.

8. A disk drive according to claim 7, wherein a thickness of the coil holding inner periphery of said coil support section is smaller than a thickness of said coil.

9. A disk drive according to claim 7, wherein, in the direction of said pivot shaft, a difference between a resonance frequency in a coil bending mode and a resonance frequency in an arm bending mode is about 800 Hz or less.

10. A disk drive comprising:
    a base;
    a motor for rotating a recording disk, said motor being fixed within said base; and a head actuator assembly comprising a head configured to access said recording disk and an actuator configured to move pivotally to position the head over the recording disk which is rotating, said head actuator assembly further comprising:

a suspension section having a front end portion to which the head is fixed;

an arm section connected to said suspension section on a side thereof opposite the front end portion of the suspension section;

a bearing section connected to said arm section on a side thereof opposite to said suspension section and having an aperture adapted to fit a pivot shaft therein; and a coil support section connected to said bearing section on a side thereof opposite to said arm section and fixing a coil to an inner periphery thereof, a thickness of the coil-fixed inner periphery being smaller than a thickness of the coil, wherein a first and a second slit are formed in a portion of said bearing section, on the side of said coil support section so as to extend substantially perpendicularly to and toward said pivot shaft, wherein the first slit is formed in a plane parallel to the top surface of the coil support section, and the second slit is formed in a plane parallel to the bottom surface of the coil support section.

11. A disk drive according to claim 10, wherein, in a fixed state of the head to said suspension section and in the direction of said pivot shaft, a difference between a resonance frequency in a coil bending mode and a resonance frequency in an arm bending mode is about 800 Hz or less.

12. A disk drive comprising:

a base;

a motor for rotating a recording disk, said motor being fixed within said base; and a head actuator assembly comprising a head configured to access said recording disk and an actuator configured to move pivotally to position the head over the recording disk which is rotating, said head actuator assembly further comprising:

a suspension section having a front end portion to which the head is fixed;

an arm section connected to said suspension section on a side thereof opposite to the front end portion of the suspension section;

a bearing section connected to said arm section on a side thereof opposite to said suspension section and having an aperture adapted to fit a pivot shaft therein; and a coil support section connected to said bearing section on a side thereof opposite to said arm section and fixing a coil to an inner periphery thereof;

wherein a first and a second slit are formed in a portion of said bearing section, on the side of said coil support section so as to extend substantially perpendicularly to and toward said pivot shaft, wherein the first slit is formed in a plane parallel to the top surface of the coil support section, and the second slit is formed in a plane parallel to the bottom surface of the coil support section.

13. A disk drive according to claim 12, wherein said slit extends from end to end in a pivoting direction of said coil support section.

14. A disk drive according to claim 12, wherein said slit is formed on both sides of said coil support section in the direction of said pivot shaft.

15. A disk drive according to claim 12, wherein a thickness of said coil support section is smaller than a thickness of said coil.

16. A disk drive according to claim 12, wherein, in the direction of said pivot shaft, a difference between a resonance frequency in a coil bending mode and a resonance frequency in an arm bending mode is about 800 Hz or less.

* * * * *

UNITED STATES PATENT AND TRADEMARK OFFICE
CERTIFICATE OF CORRECTION

PATENT NO. : 7,460,340 B2 Page 1 of 1
APPLICATION NO. : 11/311998
DATED : December 2, 2008
INVENTOR(S) : Tanizawa et al.

It is certified that error appears in the above-identified patent and that said Letters Patent is hereby corrected as shown below:

Title page, item (56); References Cited, Foreign Patent Documents, please delete "JP 11-068773" and insert -- JP 11-066773 --.

Signed and Sealed this

Seventeenth Day of February, 2009

JOHN DOLL
*Acting Director of the United States Patent and Trademark Office*